United States Patent [19]

Burchett

[11] Patent Number: 4,753,116
[45] Date of Patent: Jun. 28, 1988

[54] DYNAMOMETERS

[75] Inventor: Clive J. Burchett, Bartley, England

[73] Assignee: Brown & Root Vickers, Ltd., London, England

[21] Appl. No.: 41,049

[22] Filed: Apr. 21, 1987

[30] Foreign Application Priority Data

Apr. 28, 1986 [GB] United Kingdom ............... 8610311
Sep. 29, 1986 [GB] United Kingdom ............... 8623354

[51] Int. Cl.⁴ ............................................. G01L 3/16
[52] U.S. Cl. ................................. 73/862.09; 73/117; 74/572; 310/74
[58] Field of Search .............. 73/862.09, 117; 74/572; 310/74

[56] References Cited

U.S. PATENT DOCUMENTS 3,146,619  9/1964  Sinclair et al. ................ 73/117 X Primary Examiner—Charles A. Ruehl
Attorney, Agent, or Firm—Shoemaker and Mattare, Ltd.

[57] ABSTRACT

A drum shaft assembly for a drum dynamometer includes at least one annular inertia element on the shaft and releaseably couplable to the shaft and drum to vary the inertia thereof. The assembly carries first interrupted thread means releasably engageable with second interrupted thread means rotatably supported in the inertia element. A manipulator is slideable axially of the drum and shaft assembly between a stand-by position and a working position where it can offer or receive the inertia element to or from the shaft and drum. The manipulator has a support for supporting the inertia element and a rotatable key operable to bring about relative rotation of the first and second interrupted thread means to fasten the inertia element to or to release the inertia element from the shaft and drum.

11 Claims, 8 Drawing Sheets ments and a manipulator for one of the inertia elements, the manipulator being shown in a retracted position;

FIG. 2 is a view on the end of the dynamometer shaft;

FIG. 3 is a fragmentary side view showing part of the drum, an inertia element coupled thereto and the manipulator which is advanced into contact with the inertia element;

FIG. 4 is a hub detail of part of the drum, the inertia element and the manipulator, the view being taken with the manipulator in its fully advanced position and in a way of a locking pin which has been moved to an unlocked position;

FIG. 5 is an end view showing part of the inertia element, male and female interrupted thread members attached to the drum hub and to the inertia element respectively, and a key ring of the transfer device;

FIGS. 6 and 7 are respectively an end view of the manipulator showing a front frame element, key ring and actuator thereof and a section on the line A—A of FIG. 6 showing an actuator and its mountings; and FIG. 8 is an exploded view of a male interrupted thread member, a female interrupted thread member, retaining ring, key ring and frame element manipulator forming part of the dynamometer.

DETAILED DESCRIPTION OF PREFERRED EMBODIMENT

In the drawings, a drive shaft assembly 1 comprises a pair of drum-defining discs 1a that are shrink-fitted onto a dynamometer shaft 1b that is supported for rotation about a generally horizontal axis by means of radial and thrust bearings 25, 26 in a bearing housing defined by a pair of half-caps 5, inner cover 6 and outer cover 7. A sleeve 1c fits between the shaft 1b and the shrunk-fit drum disc 1a. Spacing between the bearings 25, 26 is maintained by means of a spacer ring 10 and outer and inner labyrinth members 8, 9 are interdigitated with the inner and outer covers 6, 7 to form a seal. The shaft 1b terminates in a coupling 29 for shaft drive means and is keyed by drive pins 23 for rotation by the coupling 29.

To either side of the drum discs 1 there are provided disc-shaped inertia elements 2 that may be coupled to the drum and shaft assembly 1 for rotation therewith as is the right hand element 2 in FIG. 1 or may be retracted therefrom as is the left hand element 2'. The invention provides mechanical means by which the inertia elements 2, 2' may be coupled to or decoupled from the shaft and drum assembly 1, and for this purpose a bed structure 100 has pairs of mountings 18 obliquely under either side of the shaft 1b. The mountings 18 provide bearings of parallel mechanisms whose other links are support links 11, 12 and ties 22. Bearings 65 in the mountings 18 support bottom pins 15 on which the links 11, 12 pivot. The upper ends of links 11 and 12 carry support fittings 13 that rotatably support top pins 14 having outward extensions that are pivoted in the ties 22. Inward extensions of the pins 14 are journalled in bushes 16 in spherical bearings 66 of side arms 102 of a manipulator frame element 3. A cylinder 27 is connected at one end by pivotal mounting 20 to the half-cap 5 with a rod thereof connected at eye end 28 to rod mounting 21 attached to the front frame 3. Accordingly extension of the rod from the fully retracted position shown in FIG. 1 advances the frame 3 towards the inertia element 2 with the attitude of the frame 3 being maintained vertical by means of the parallel mechanisms, the cylinder 27 being double-acting to return the frame 3 when required.

DYNAMOMETERS

FIELD OF THE INVENTION

The present invention relates to a dynamometer that is of particular advantage for the testing of tyres and brakes of aircraft, though it may also be used to test other vehicle tyres and brakes, and in general for monitoring the acceleration, deceleration or energy tolerance of any moving device intended to be coupled to a vehicle. More particularly, the invention is concerned with the drum and shaft assembly of such a dynamometer.

BACKGROUND TO THE INVENTION

The use of a so-called "chassis dynamometer" with inertial weights to measure the acceleration and deceleration performance of an automobile or other vehicle has long been known (see Knudsen R. F., "Inertia Electronically", ISA Journal, April 1958, Vol. 5. No. 4. pp 52–54). Further dynamometers are described in Patent Specifications Nos. GB-A-1297813, 1604320 and 2149520 and in Roberts J. B., "An Advanced High-Speed Dynamometer for Testing Aircraft Tyres, Wheels and Brakes", read before the Applied Mechanics Group of the Institution of Mechanical Engineers on 10 Apr. 1974.

This invention is concerned with a dynamometer of the above general kind in which a test subject is urged towards a rotatory drum by means of a loading head and provision is made for mechanical means to attach or detach the or each inertia element from a rotating drum and shaft assembly. Thus for tests under high acceleration it may be desirable for the drum and shaft assembly to have a low moment of inertia, whereas under other test conditions it may be desirable to have a greater drum width and inertia. It is understood that the change in drum width and actual inertia may be used in addition to inertia simulation as described by Knudsen or energy control as described in Patent Specification No. GB-A-2149520.

Accordingly, the invention provides a drum shaft assembly for a drum dynamometer including at least one annular inertia element on the shaft and releaseably couplable to the assembly to vary the inertia thereof, wherein the assembly carries first interrupted thread means releaseably engageable with second interrupted thread means rotatably supported in the inertia element, and manipulator means is slideable axially of the drum and shaft assembly between a stand-by position and a working position where it can offer or receive the inertia element, the manipulator means having support means for supporting the inertia element and rotatable key means operable to bring about relative rotation of the first and second interrupted thread means to fasten the inertia element to or to release the inertia element from the assembly.

Other preferred features of the invention are defined in the appended claims to which attention is hereby directed.

BRIEF DESCRIPTION OF THE DRAWINGS

An embodiment of the invention will now be described, by way of example only, with reference to the accompanying drawings, in which:

FIG. 1 is a side view of part of the shaft of a dynamometer showing in partial section a drum, inertia ele- In FIGS. 1, 3 and 4 a male interrupted thread member 31 is bolted by means of cap screws 54 to the sleeve 1c, has a male frustoconical support surface 31a directed at an angle of about 15 degrees to the axis of the shaft 1b at its end adjacent to the disc 1a and teeth 31b defining an interrupted thread towards its end remote from the disc 1a.

Figure 1:
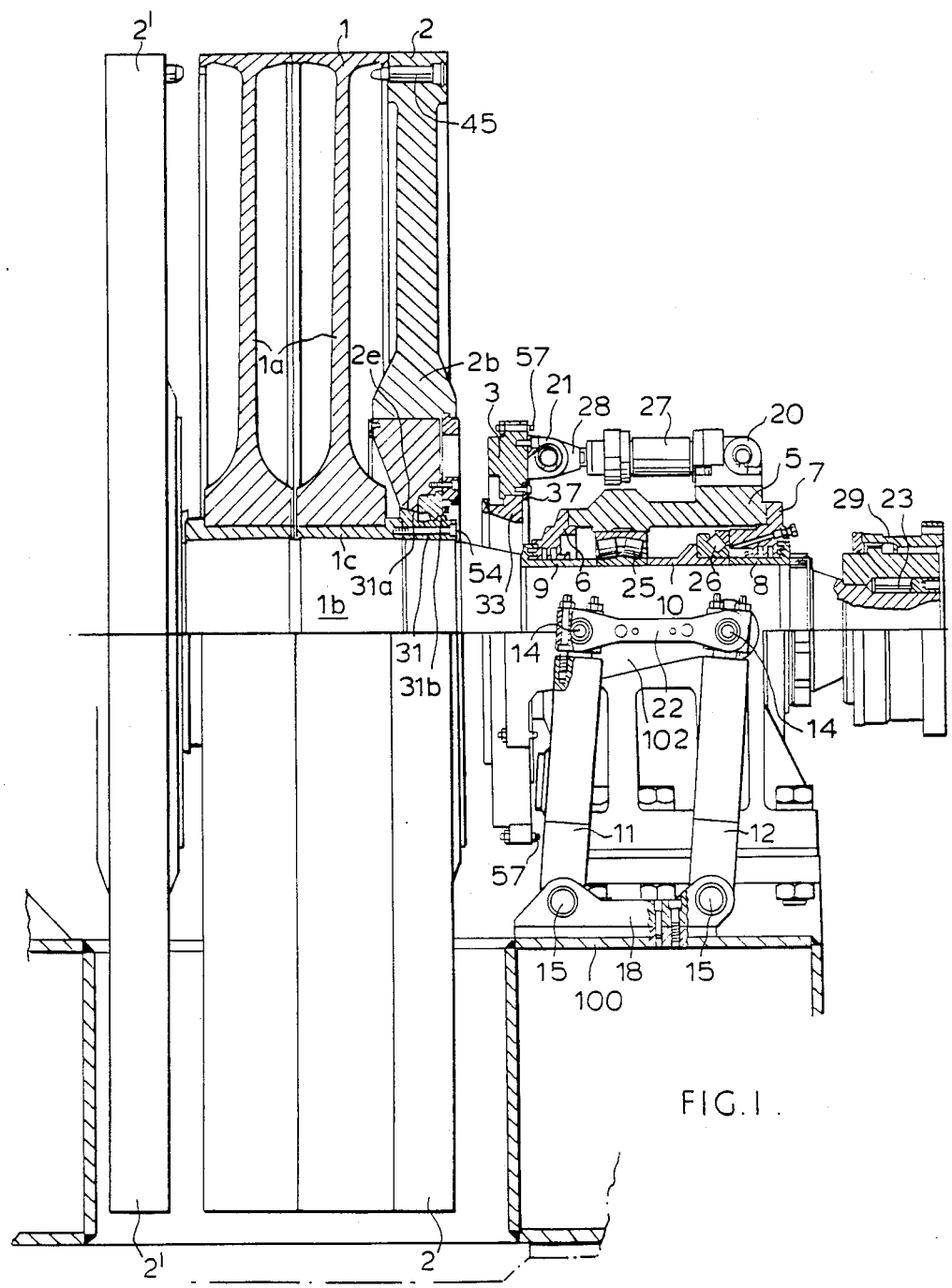
Figure 3:
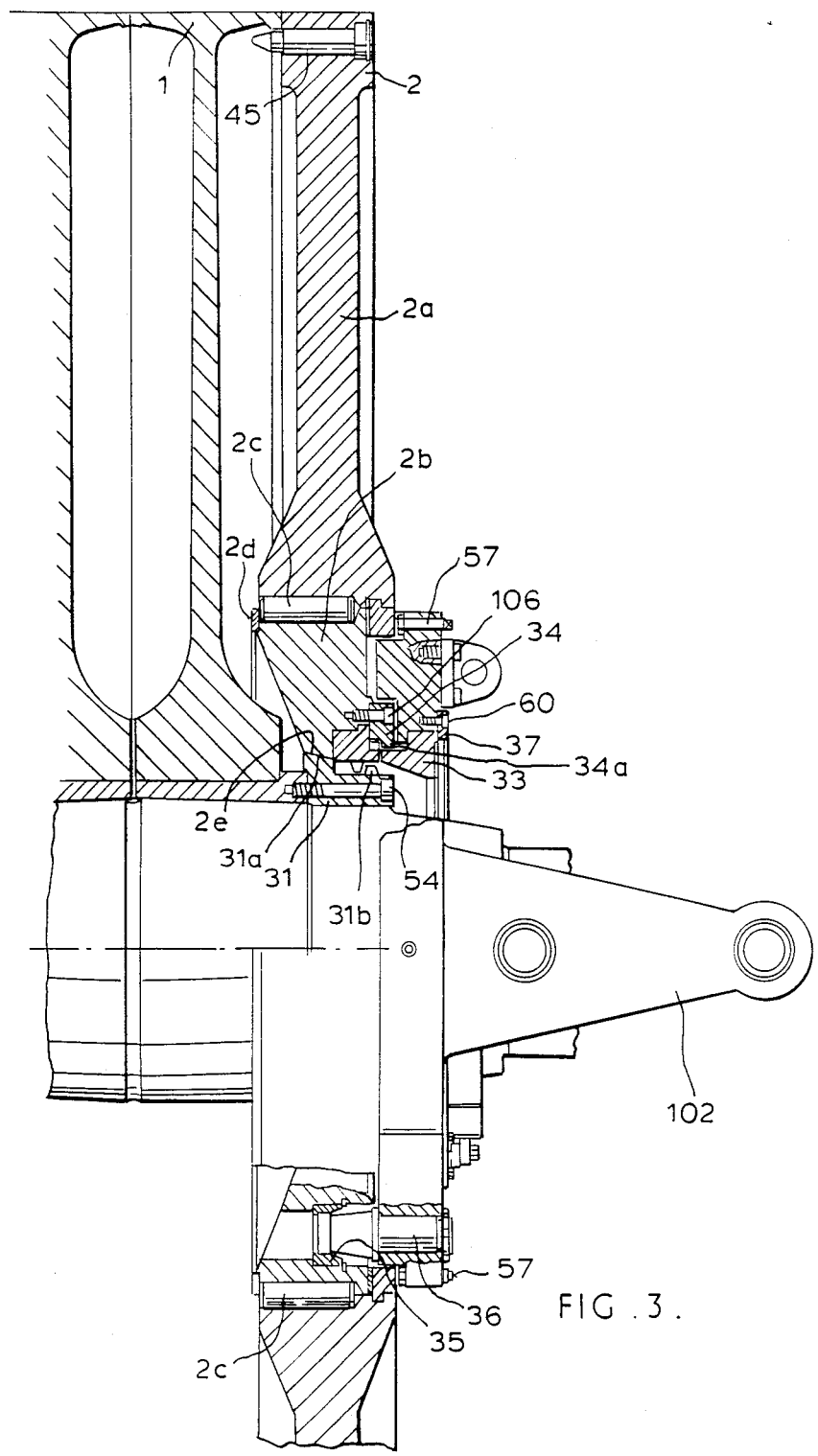
Figure 4:
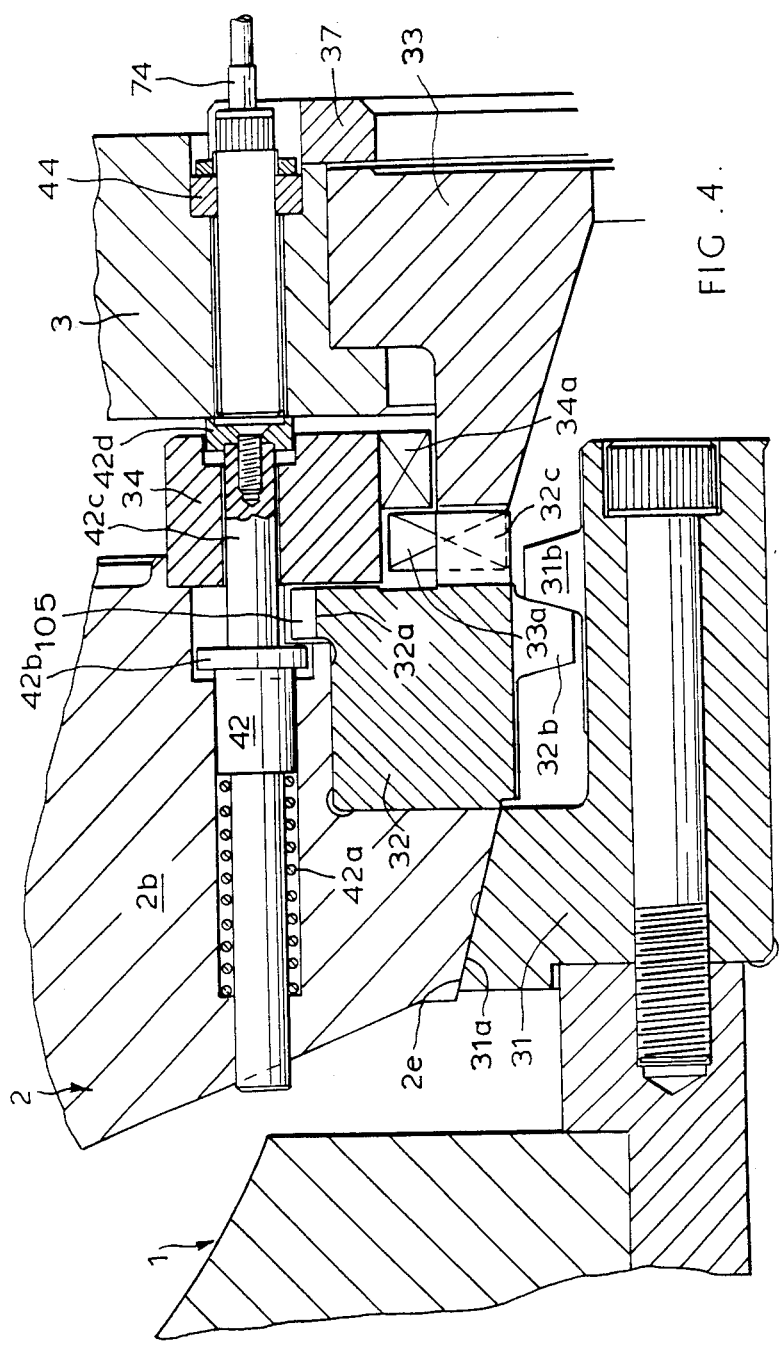
Figure 5:
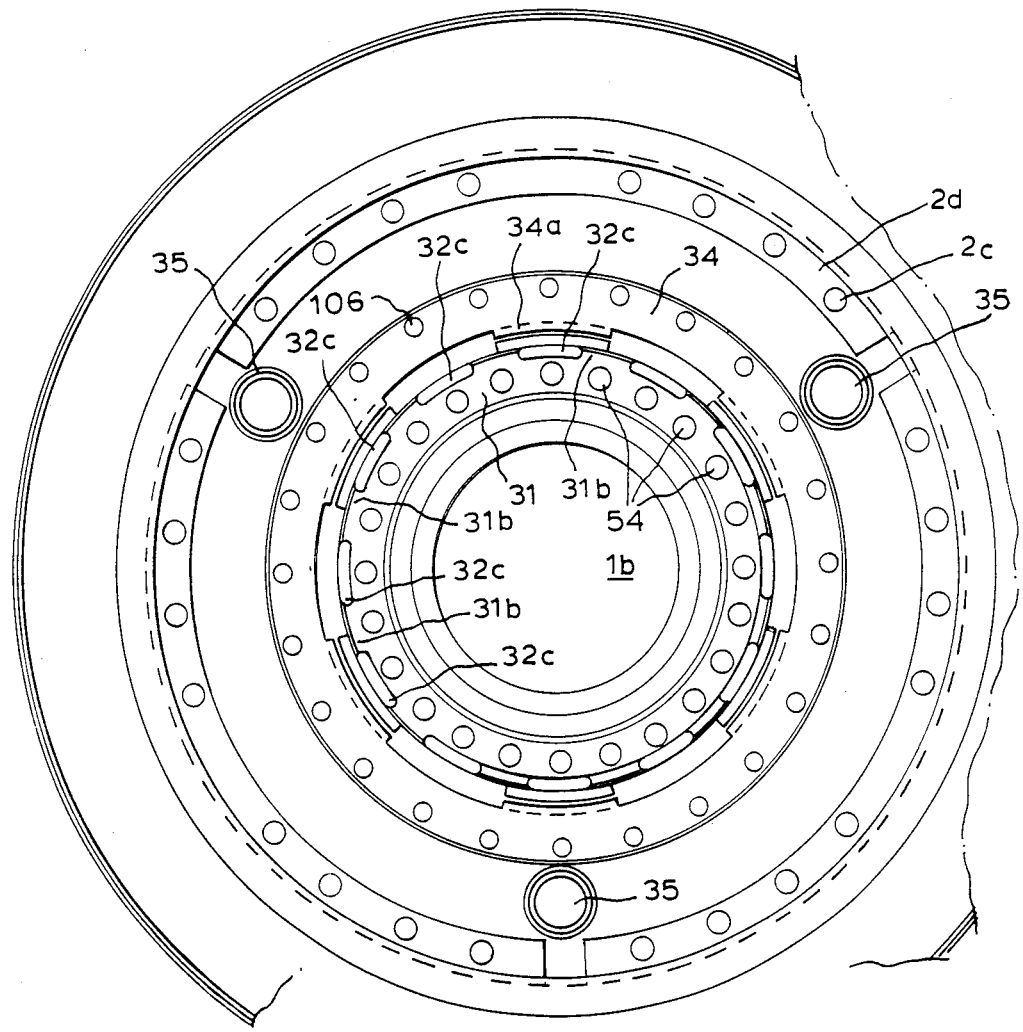
Figure 6:
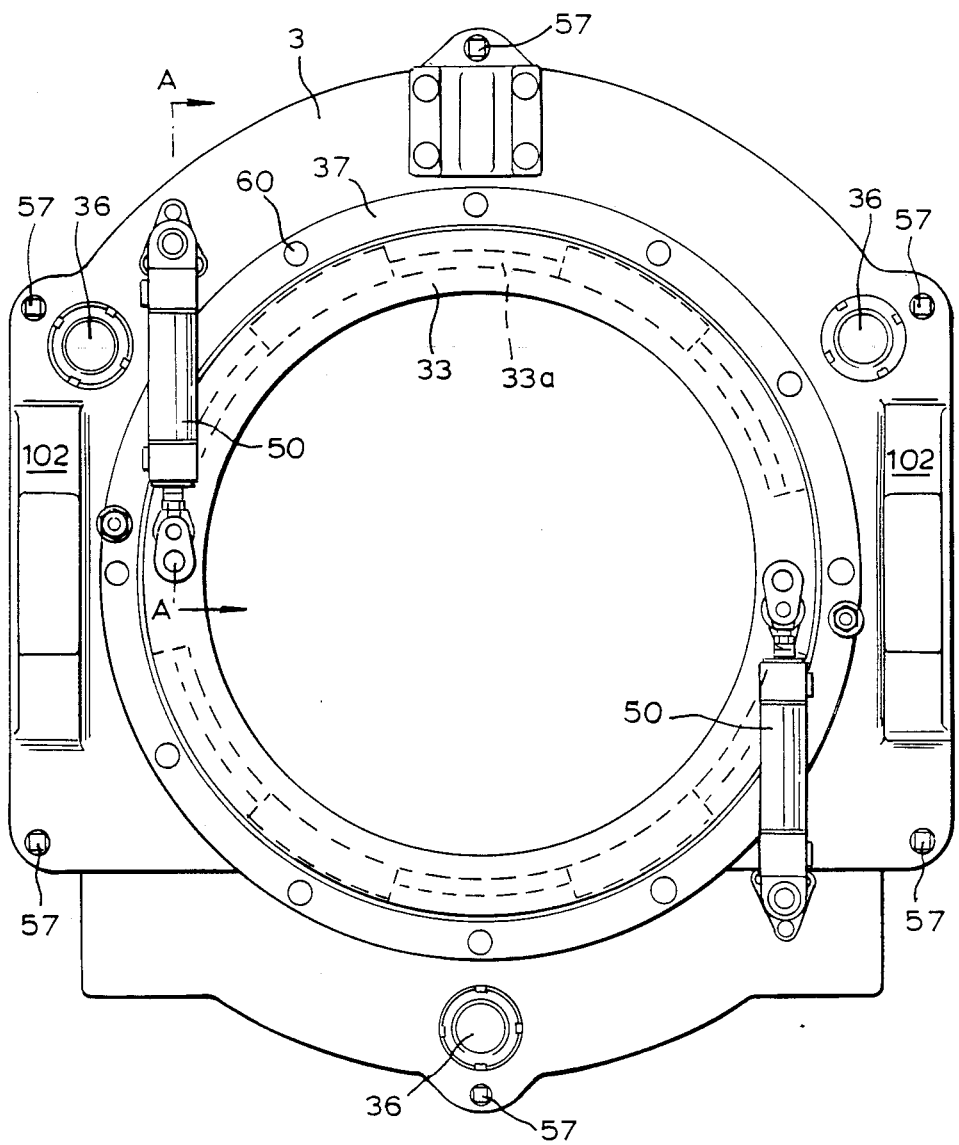
Figure 7:
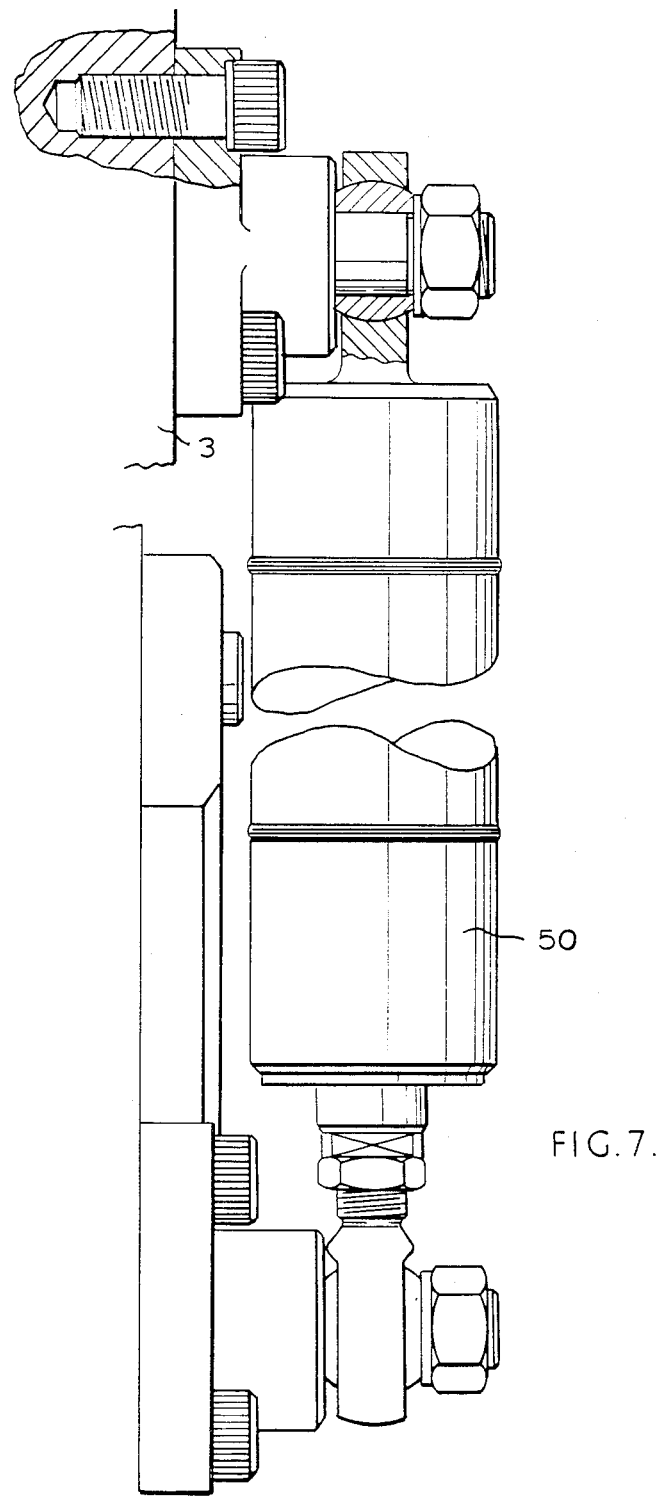
Figure 8:
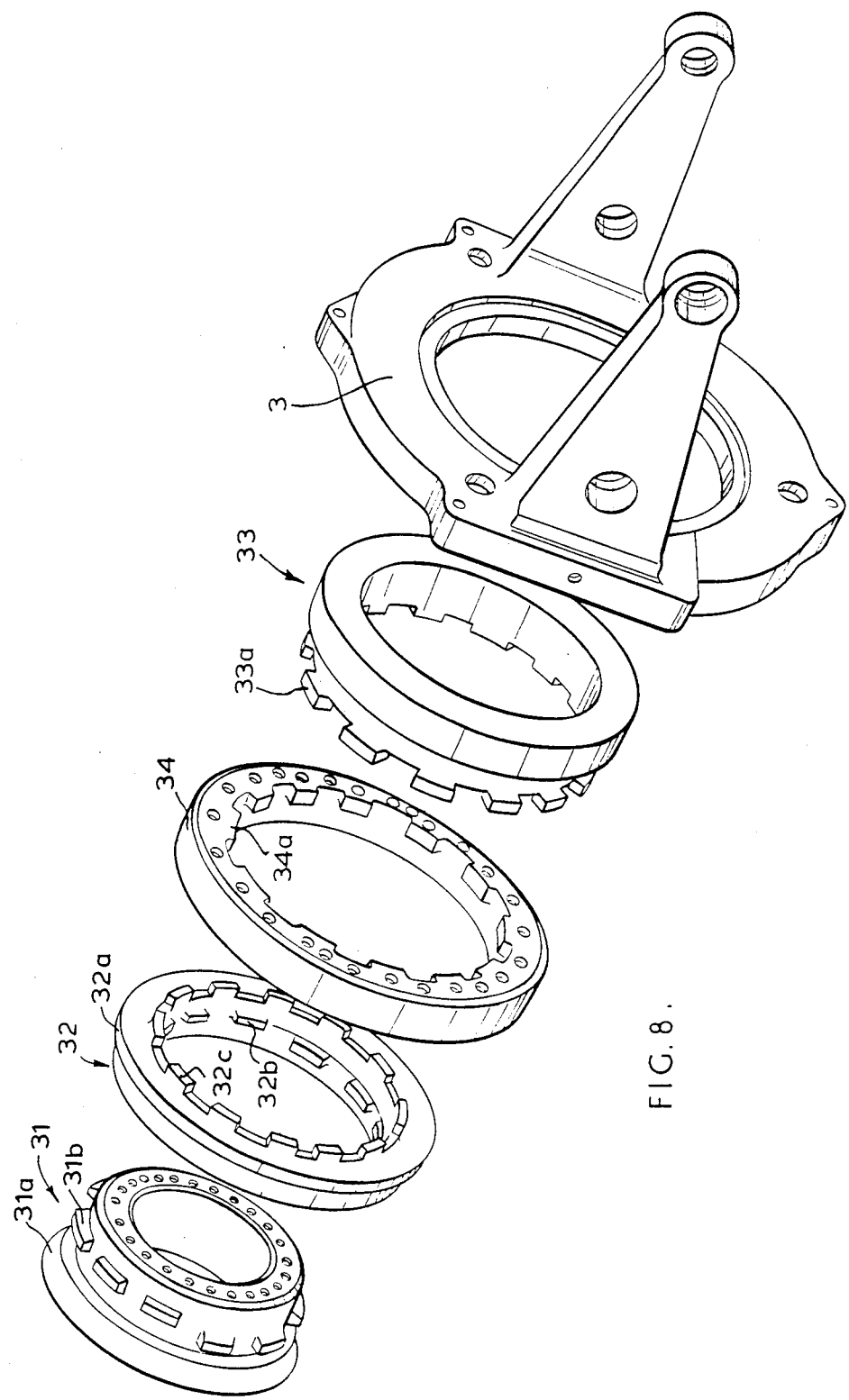

The inertia element assembly 2 includes an outer disc 2a that fits onto a hub 2b with load-transmitting dowels 2c held in position by inner circlip 2d. The hub 2b has a female frustoconical surface 2e that when the inertia element 2 is in position on the male member 31 mates with the surface 31a to support the weight of the inertia element. A retaining ring 34 on the outer face of the inertia element 2 assists in holding the disc 2a in position on the hub 2b. A female interrupted thread member 32 in the form of a ring is rotatably supported on the outer face of the hub 2b with a radially projecting flange 32a on its outer face sliding in a groove defined between a rebate 105 in the outer face of the hub 2b and the retaining ring 34 attached thereto by means of bolts 106. The ring 34 is formed at its outer extremity with inturned teeth 34a of an interrupted flange. The member 32 is further formed with axially directed castellated teeth 32c. The inner face of the ring 32 is formed with inturned teeth 32b defining a female interrupted thread that in the position shown in FIGS. 1, 3 and 4 are engaged behind teeth 31b of the male member 31 to prevent the element 2 from becoming displaced axially off the male member 31. As is apparent in FIG. 5 the angle subtended by each tooth 31b, 32b, 32c at the axis of the shaft 1b is half (in this instance 15 degrees) of the angular extent of the teeth 34a (in this instance 30 degrees). At the outer diameter of the element 2 drive pins 45 on the inner face of the element locate in sockets in the drum 1.

In order to be able to remove the inertia element 2 from the drum shaft assembly 1, the manipulator frame element 3 carries a rotatable key ring 33. A flange at the outer end of the ring 3 locates in a rebate in the frame element 3 and is held in place by means of a retaining ring 37 that is fastened to the outer face of frame element 3 by cap screws 60. The outer face of frame element 3 carries a pair of key actuator cylinders 50 pivoted between the frame element 3 and the key ring 33 which are operable to effect locking and release rotational movements of the ring 33. The inner end of the ring 33 is inwardly hooked to define interrupted teeth 33a and is apertured to permit entry of the axially directed castellated teeth 32c of the female interrupted thread member of ring 32. Thus on rotation of the ring 33 by actuators 50 (a) the teeth 33a are registered with or removed from register with the teeth 34a of the retaining ring 34, thus attaching the inertia element to or releasing the inertia element 2 from the manipulator frame element 3, (b) the rotational movement is transmitted via the castellated teeth 32c to the female ring 32, and (c) the interrupted thread teeth 32b of the female member are registered with or removed from register with the teeth 31b of the male interrupted thread member 31, thereby fastening the inertia element 2 to or releasing the inertia element 2 from the drum shaft assembly 1. The frame element 3 also carries on its inner face three spigots 36 that as the element 3 is offered to the inertia element 2 enter bushes 35 in the hub 2b which take the load of the inertia element 2 when it is on the frame element 3. The inertia element 2 is therefore supported at all times either by the tapered surface 31a of the male member or by the spigots 36. The periphery of the frame element 3 carries inwardly directed set screws 57 that when the element 3 is offered to the element 2 butt against the retaining ring 34 for proper axial positioning of members 2 and 3.

Figure 2:
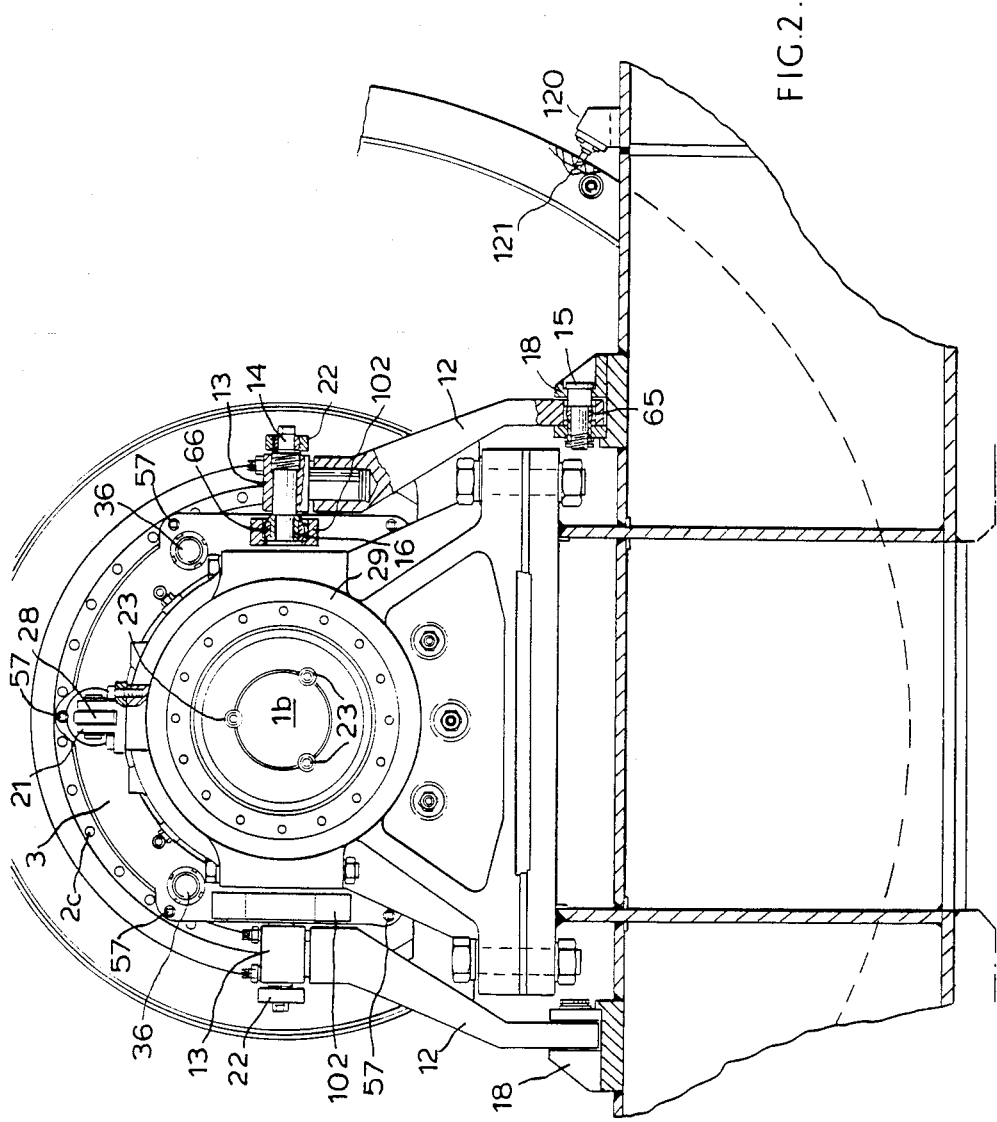

It will be appreciated that for attachment and removal of the inertia elements 2, 2', the drum and shaft assembly 1 and the manipulator element 3 have to be in a proper angular position. A dedicated DC drive motor is therefore provided to inch the drum and shaft assembly round until a datum plug 120 (FIG. 2) registers with a sensor 121 (FIG. 2) to indicate that the correct angular position has been reached. Thus the plug 120 may be a brass insert in the steel of the drum 1a and the sensor 121 may be a magnetic proximity sensor that changes state when it is adjacent brass rather than steel.

From the standpoint of safety it is desirable to provide interlocking means so that an inertia element 2 or 2' cannot be released from the shaft and drum assembly 1 unless the manipulator has been advanced to accept and support it. For this purpose a locking pin 42 that is slideable in a bore in the hub 2b is biased on the direction of the outer hub face by a coil spring 42a or other resilient means to bring its head 42b normally into register with the teeth 32a. When the inertia element 2 is on the shaft and hub assembly 1 and the manipulator has been retracted, the pin 42 prevents rotation of the female member or ring 32. An extension 42c on the outer face of head 42b passes through the retaining ring 34 to the outer face thereof and carries at its extremity a magnetic pad 42d. As the frame element 3 is offered to the inertia element 2, it encounters the pad 42d and moves the pin 42 inwardly against the resistance of the spring 42a, freeing the member 32. An inductive proximity switch 74 detects the pin 42 and enables the position thereof to be monitored, thereby giving an indication whether the inertia element 2 is in a locked or releasable state. A further function of the pin 42 is to keep the inertia element locked in position on the drum and shaft assembly against the risk that it might vibrate loose during a test, and for this purpose it is desirable to be able to monitor that locking has in fact occurred. For this purpose, when an inertia element 2 or 2' has been fitted to the drum and shaft assembly, the manipulator is retracted a small distance, and it is ascertained whether the magnetic pad 42d is present protruding the expected small distance from the hub of the inertia element.

It will be appreciated that various modifications may be made to the embodiment described above without departing from the invention, the scope of which is defined in the appended claims.

I claim:

1. A drum shaft assembly for a drum dynamometer including at least one annular inertia element on the shaft and releaseably couplable to the shaft and drum to vary the inertia thereof, wherein the assembly carries first interrupted thread means releasably engageable with second interrupted thread means rotatably supported in the inertia element, and manipulator means is slideable axially of the drum and shaft assembly between a stand-by position and a working position where it can offer or receive the inertia element to or from the shaft and drum, the manipulator means having support means for supporting the inertia element and rotatable key means operable to bring about relative rotation of the first and second interrupted thread means to fasten the inertia element to or to release the inertia element from the shaft and drum.

2. An assembly according to claim 1, wherein the first interrupted thread means comprises sleeve means on the shaft having tapered bearing surface means that mates with complementary tapered bearing surface means in hub means of the inertia element to support the inertia element when it is fastened for rotation with the drum shaft.

3. An assembly according to claim 1, wherein locking pin means in the inertia element engages the second interrupted thread means to prevent rotation thereof and is arranged during travel of the manipulator means to its working position to be disengaged from the second interrupted thread means so that the inertia element can be released from the assembly only when the manipulator means is in its working position.

4. An assembly according to claim 3, wherein proximity switch means in the manipulator is responsive to the locking means so that movement of the pin to its locking position can be confirmed.

5. An assembly according to claim 4, wherein the proximity switch is magnetically operated over a short response distance and the pin carries magnet means.

6. An assembly according to claim 1, wherein the manipulator means has bearing pins on an inner face thereof that enter socket means in the inertia element during travel of the manipulator means to its working position, said pins bearing the weight of an inertia element on the manipulator means.

7. An assembly according to claim 1, further comprising actuator means for moving the manipulator means axially of the drum and shaft assembly and parallel linkage means for supporting and controlling the attitude of the manipulator means during such movement.

8. An assembly as claimed in claim 1, wherein the second interrupted thread means has second teeth that are castellated and directed axialy outwards and the key means is a rotatable ring having on an inner face thereof formations that are engaged by the castellated teeth for transfer of rotational movement of the key means to the second interrupted thread means.

9. An assembly according to claim 8, wherein the second interrupted thread means is held in position by retaining ring means on the outer face of the inertia element, inturned interrupted teeth on the retaining ring means being engageable with out-turned interrupted teeth of the key means to reversibly couple the inertia element to the manipulator means as it is uncoupled from the drum and shaft.

10. An assembly according to claim 1, wherein fixed sensor means is located in the path of indicator means on the drum to enable a determination to be made that the drum is in an angular position where the inertia element can be manipulated.

11. A drum dynamometer having a shaft assembly as claimed in claim 1.

* * * * *